US010996644B2

(12) United States Patent
Somani et al.

(10) Patent No.: US 10,996,644 B2
(45) Date of Patent: May 4, 2021

(54) METHOD AND SYSTEM FOR EXTRACTING EXCESS POWER

(71) Applicant: DYNAPOWER COMPANY LLC, South Burlington, VT (US)

(72) Inventors: Apurva Somani, South Burlington, VT (US); Xiaorong Xia, South Burlington, VT (US); Gysler Castelino, South Burlington, VT (US); Anup Thapa, South Burlington, VT (US)

(73) Assignee: DYNAPOWER COMPANY LLC, South Burlington, VT (US)

( * ) Notice: Subject to any disclaimer, the term of this patent is extended or adjusted under 35 U.S.C. 154(b) by 0 days.

(21) Appl. No.: 15/980,224

(22) Filed: May 15, 2018

(65) Prior Publication Data

US 2018/0329382 A1 Nov. 15, 2018

Related U.S. Application Data

(60) Provisional application No. 62/506,363, filed on May 15, 2017.

(51) Int. Cl.
| | |
|---|---|
| *G05B 19/042* | (2006.01) |
| *H02J 3/38* | (2006.01) |
| *H02J 7/35* | (2006.01) |
| *H02J 3/32* | (2006.01) |

(52) U.S. Cl.
CPC ............. *G05B 19/042* (2013.01); *H02J 3/32* (2013.01); *H02J 3/383* (2013.01); *H02J 3/385* (2013.01); *H02J 7/35* (2013.01); *G05B 2219/2639* (2013.01)

(58) Field of Classification Search
CPC .................................................. G05B 19/042
See application file for complete search history.

(56) References Cited

U.S. PATENT DOCUMENTS

| | | | | |
|---|---|---|---|---|
| 5,963,015 A | * | 10/1999 | Lee ........................ | H02J 7/0068 320/128 |
| 7,158,395 B2 | * | 1/2007 | Deng ....................... | G05F 1/67 363/95 |
| 9,389,632 B2 | * | 7/2016 | Km .......................... | G05F 3/08 |

(Continued)

OTHER PUBLICATIONS

"The Modern Industrial Workhorse: PID Controllers", Apr. 6, 2020, Tech Briefs, pp. 1-5 (Year: 2020).*

(Continued)

*Primary Examiner* — Santosh R Poudel

(57) ABSTRACT

A power system for connecting a power source, an energy storage unit and a grid includes a power inverter, an energy storage power converter and a controller. The power inverter is electrically coupled to the power source through a DC bus and converts DC power from the DC bus to AC power output to the grid. The power converter is electrically coupled between the DC bus and the energy storage unit and stores power in the energy storage unit and discharges power from the energy storage unit. The controller controls the power converter to store excess power from the power source that cannot be output to the grid in the energy storage unit, and control the energy storage power converter to discharge power stored in the energy storage unit to the power inverter to output to the grid.

16 Claims, 6 Drawing Sheets

(56) References Cited

U.S. PATENT DOCUMENTS

| | | | | |
|---|---|---|---|---|
| 2002/0150802 | A1* | 10/2002 | Imamura | H01M 8/04007 |
| | | | | 429/413 |
| 2002/0186387 | A1* | 12/2002 | Moroney | G06T 5/20 |
| | | | | 358/1.9 |
| 2004/0124805 | A1* | 7/2004 | Edwards | H02M 7/487 |
| | | | | 318/700 |
| 2010/0231045 | A1 | 9/2010 | Collins et al. | |
| 2013/0046495 | A1* | 2/2013 | Sim | H01M 10/48 |
| | | | | 702/63 |
| 2013/0077372 | A1* | 3/2013 | Wagoner | H02J 3/383 |
| | | | | 363/131 |
| 2013/0307329 | A1* | 11/2013 | Ito | B60K 6/445 |
| | | | | 307/10.1 |
| 2014/0159666 | A1* | 6/2014 | Takeyama | H02J 7/0013 |
| | | | | 320/126 |
| 2014/0203649 | A1 | 7/2014 | Cheek et al. | |
| 2014/0210275 | A1* | 7/2014 | Gong | H02J 3/383 |
| | | | | 307/82 |
| 2015/0001932 | A1 | 1/2015 | Inoue et al. | |
| 2015/0214754 | A1* | 7/2015 | Choi | H02J 7/007 |
| | | | | 320/134 |
| 2016/0285267 | A1* | 9/2016 | Stone | G05B 15/02 |
| 2016/0329716 | A1* | 11/2016 | Inoue | H02J 3/383 |
| 2018/0087241 | A1* | 3/2018 | Hoshino | F02D 29/06 |

OTHER PUBLICATIONS

The International Search Report and Written Opinion dated Sep. 21, 2018; PCT/US2018/032711.

\* cited by examiner

METHOD AND SYSTEM FOR EXTRACTING EXCESS POWER

RELATED APPLICATIONS

The present patent document claims the benefit of the filing date under 35 U.S.C. § 119(e) of Provisional U.S. Patent Application Ser. No. 62/506,363, filed May 15, 2017, which is hereby incorporated by reference.

BACKGROUND OF THE INVENTION

Embodiments of the present invention relate generally to power systems, and more specifically, to methods and systems for extracting excess power for storage in an energy storage unit and discharging power from the energy storage unit in a power system comprising interconnected power assets.

Electric power conversion devices and associated control systems may be used to interface various energy resources. For example, a power system can include a variety of interconnected distributed energy resources (e.g., power generators and energy storage units) and loads. The power system may also connect to a utility grid or a microgrid system. The power system employs the electric power conversion to convert power between these energy resources (e.g., AC/DC, DC/DC, AC/AC and DC/AC).

Power systems may be designed to supply power, regulate power and transfer power from one source to another with one potential goal being to provide uninterrupted power to one or more loads of a power grid. It is desirable to provide power in the most efficient manner possible, so that the maximum possible amount of energy generation is used. However, topology limitations and design requirements can be limitations the energy generation that is ultimately used.

A power system may be designed with an energy storage unit such as battery energy storage or flywheel energy storage. The energy storage unit may be utilized to store energy from a renewable energy source, such as a solar array or a wind turbine. Energy from a grid, such as a utility grid or another microgrid, may also be available for storage in energy storage units.

When the power source of an energy storage system is a renewable source such as wind energy or solar energy, multiple power converters can be employed to supply energy. The power converters may include power inverters to convert the power supplied by the renewable source to alternating current (AC) for supplying the power to, e.g., an AC grid and/or AC loads, and DC/DC converters to convert the power supplied by the renewable source to, e.g., DC loads and/or energy storage units such as batteries or flywheels. These power converters may have limitations that prevent them from extracting the full power available from the renewable power source, in which case the power converter may be referred to as operating in a "curtailed" or "clipped" fashion. The excess power that is curtailed or clipped due to the design limitations can be lost, leading to less efficient power generation.

BRIEF SUMMARY OF THE INVENTION

Embodiments of the present invention include system and methods for charging and discharging power to/from an energy storage unit. In embodiments of the present invention, excess power generated by a power source such as a photovoltaic power source may be captured and stored in an energy storage unit. Further, in embodiments of the present invention power stored in the energy storage unit may be discharged while providing priority to power generated by the power source. Further, in embodiments of the present invention, the power source can be emulated by an energy storage power converter controller during power discharge.

In one aspect, a power system for connecting a power source, an energy storage unit and a grid includes a power inverter, an energy storage power converter and a controller. The power inverter is electrically coupled to the power source through a DC bus and converts DC power from the DC bus to AC power output to the grid. The energy storage power converter is electrically coupled between the DC bus and the energy storage unit and stores power in the energy storage unit and discharges power from the energy storage unit. The controller controls the energy storage power converter and is configured to control the energy storage power converter to store excess power from the power source that cannot be output to the grid in the energy storage unit, and control the energy storage power converter to discharge power stored in the energy storage unit to the power inverter to output to the grid.

The controller being configured to control the energy storage power converter to capture excess power from the power source may comprise the controller being configured to: determine if the power inverter is curtailed; when the power inverter is curtailed, increase a charge command of the power converter to store excess power in the energy storage unit; and when the power inverter is not curtailed, decrease a charge command of the power converter.

The controller being configured to control the energy storage power converter to capture excess power from the power source may include the control system being configured to: determine whether an output power of the PV inverter exceeds a first predetermined threshold; when the output power of the PV inverter exceeds the first predetermined threshold, increase a charge command of the energy storage power converter to store the excess power in the energy storage unit; and when the output power of the power inverter does not exceed the first predetermined threshold, determine whether the output power of the power inverter is less than a second predetermined threshold, and when the output power is less than the second predetermined threshold, decrease the charge command of the energy storage power converter.

The control system being configured to control the energy storage power converter to capture excess power from the power source may include the control system being configured to: determine if a current output power of the power source is less than a previous output power of the power source; and adjust a high voltage limit on the DC bus according to the determination as to whether the current output power of the power source is less than the previous output power of the power source to track a maximum power point of the power source.

The controller may be a converter controller that controls the energy storage power converter without requiring input from the controller of the power inverter. Further, the controller being configured to control the energy storage power converter to capture excess PV power from the PV array may comprise the control system being configured to: autonomously detect curtailment on the power inverter without input from a power inverter controller; and when curtailment is detected, control the energy storage power converter to store the excess power in the energy storage unit up to the maximum power source power point.

The controller may be a converter controller that controls the energy storage power converter without requiring input from the controller of the power inverter. Further, the controller being configured to control the energy storage power converter to capture excess PV power from the PV array comprises the control system being configured to: determine a change in an output power of the energy storage power converter; determine a change in a voltage at the DC bus; and adjust a high voltage limit on the DC bus according to the change in the output power of the energy storage power converter and the change in the voltage at the DC bus.

The controller being configured to control the energy storage power converter to discharge power stored in the energy storage unit to the power inverter to output to the grid may include the controller being configured to discharge power from the energy storage unit while giving priority to any power available from the power source.

The controller being configured to discharge power from the energy storage unit while giving priority to any power available from the power source may include the controller being configured to: determine whether the power inverter is not curtailed; when the power inverter is not curtailed, determine whether an output power of the power source has decreased and control the energy storage power converter to adjust a power being discharged from the energy storage unit according to whether the output power of the power source has decreased.

The controller being configured to adjust the power being discharged from the energy storage unit according to whether the output power of the power source has decreased may include the controller being configured to adjust a discharge power command for the energy storage power converter to discharge an amount of power by a power discharge adjustment value whose sign is changed according to whether the output power of the power source has decreased.

The power source may be a photovoltaic power source, and the controller being configured to control the energy storage power converter to discharge power stored in the energy storage unit to the power inverter to output to the grid may include the controller being configured to control the energy storage power converter to emulate the power output of the photovoltaic power source.

The controller may emulate the photovoltaic power source through a look up table programmed to emulate the power-voltage characteristics of the photovoltaic power source.

The controller may also emulate the photovoltaic power source by controlling a power command of the energy storage unit power converter based on a droop parameter.

The controller may be a converter controller of the energy storage unit converter, and the converter controller may communicate with a controller of the power inverter to obtain information about the output power of the power inverter.

In another aspect, a method of capturing excess power from a power source in a power system comprising a power inverter coupled to the power source through a DC bus, and an energy storage power converter coupled between the DC bus and an energy storage unit comprises: determining if the power inverter is curtailed; when the power inverter is curtailed, adjusting a charge command of the power converter to store excess power from the power source that cannot be output to the grid in the energy storage unit.

Determining if the power inverter is curtailed may include determining whether an output power of the PV inverter exceeds a first predetermined threshold.

Determining if the power inverter is curtailed and adjusting a charge command of the power converter to store excess power from the power source that cannot be output to the grid in the energy storage unit may include: increasing the charge command of the power converter to store excess power from the power source that cannot be output to the grid when the output power of the power inverter exceeds a first predetermined threshold; and decreasing the charge command of the power converter when the output power is less than a second predetermined threshold.

Adjusting a charge command of the power converter to store excess power from the power source that cannot be output to the grid in the energy storage unit may include: determining if a current output power of the power source is less than a previous output power of the power source; and adjusting a high voltage limit on the DC bus according to the determination as to whether the current output power of the power source is less than the previous output power of the power source to track a maximum power point of the power source.

The high voltage limit may be adjusted by a voltage change value, and the sign of the voltage change value is reversed when the output power of the power source is less than the previous output power of the power source.

Determining if the power inverter is curtailed and adjusting a charge command of the power converter to store excess power from the power source that cannot be output to the grid in the energy storage unit when the power inverter is curtailed may include: determining a change in an output power of the energy storage power converter; determining a change in a voltage at the DC bus; adjusting a high voltage limit on the DC bus according to the change in the output power of the energy storage power converter and the change in the voltage at the DC bus.

The high voltage limit may be adjusted by a voltage change value, and a sign of the voltage change value is reversed when the change in the output power of the energy storage power converter is positive and the change in the at the DC bus is zero or a small negative value, and a sign of the voltage change value is reversed when the change in the output power of the energy storage power converter is negative and the change in the at the DC bus is positive.

In another aspect, a method of discharging power stored in an energy storage unit to output to a grid in a power system comprising a power inverter coupled to a power source through a DC bus, and an energy storage power converter coupled between the DC bus and the energy storage unit comprises: discharging power from the energy storage unit to the power inverter such that the power inverter can supply the power to the grid. When discharging power from the energy storage unit, power available from the power source is given priority over power available from the energy storage unit.

Discharging power from the energy storage unit to the power inverter such that the power inverter can supply the power to the grid may include: determining whether the power inverter is not curtailed; when the power inverter is not curtailed, determining whether an output power of the power source has decreased; and adjusting a power being discharged from the energy storage unit according to the determination as to whether the output power of the power source has decreased.

The power being discharged from the energy storage unit may be adjusted by a power discharge adjustment value whose sign is changed according to whether the output power of the power source has decreased.

The power source may be a photovoltaic power source, and discharging power from the energy storage unit to the power inverter such that the power inverter can supply the power to the grid may include emulating the photovoltaic power source through a look up table programmed to emulate the power-voltage characteristics of the photovoltaic power source.

The power source may be a photovoltaic power source, and discharging power from the energy storage unit to the power inverter such that the power inverter can supply the power to the grid may include emulating the photovoltaic power source by controlling a power command of the energy storage unit power converter based on a droop parameter.

In another aspect, a method of discharging power stored in an energy storage unit to output to a grid in a power system comprising a power inverter coupled to a power source through a DC bus, and an energy storage power converter coupled between the DC bus and the energy storage unit comprises: obtaining a voltage of the DC bus; and discharging power from the energy storage unit to the power inverter such that the power inverter can supply the power to the grid by emulating the power source according to the voltage of the DC bus.

Discharging power from the energy storage unit to the power inverter such that the power inverter can supply the power to the grid may include obtaining a corresponding output power for the energy storage power converter from a look up table based on the voltage of the DC bus, wherein the look up table is programmed to emulate the power-voltage characteristics of the photovoltaic power source.

Discharging power from the energy storage unit to the power inverter such that the power inverter can supply the power to the grid may include emulating the photovoltaic power source by controlling a power command of the energy storage unit power converter based on a droop parameter. Emulating the photovoltaic power source may include calculating a power command for controlling the energy storage converter to output power in accordance with the following equation:

$$Pcmd = Pset - Vdroop * (V\_pv - V\_set)$$

where:
Pcmd is the power command;
Pset is a predetermined set power;
Vdroop is the droop parameter for emulating the current voltage characters of the photovoltaic power source;
V_pv is the voltage of the DC bus; and
V_set is a predetermined set voltage for emulating the current voltage characters of the photovoltaic power source.

BRIEF DESCRIPTION OF THE FIGURES
(NON-LIMITING EMBODIMENTS OF THE DISCLOSURE)

DETAILED DESCRIPTION

Reference will now be made to the accompanying drawings, which form a part hereof, and which show, by way of illustration, specific exemplary embodiments. The principles described herein may, however, be embodied in many different forms. The components in the figures are not necessarily to scale, emphasis instead being placed upon illustrating the principles of the invention. Moreover, in the figures, like referenced numerals may be placed to designate corresponding parts throughout the different views.

In the following description of the invention, certain terminology is used for the purpose of reference only, and is not intended to be limiting. For example, although the terms first, second, etc. may be used herein to describe various elements, these elements should not be limited by these terms. These terms are only used to distinguish one element from another. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed terms. It will be further understood that the terms "comprises" and/or "comprising," when used in this specification, specify the presence of stated features, integers, steps, operations, elements, and/or components, but do not preclude the presence or addition of one or more other features, integers, steps operations, elements, components, and/or groups thereof.

Embodiments of the present invention include a system and method of capturing excess power generated by a power source that may be lost due to power converter curtailment. Embodiments of the present invention include a system and method for discharging power captured by an energy storage unit.

Figure 1:
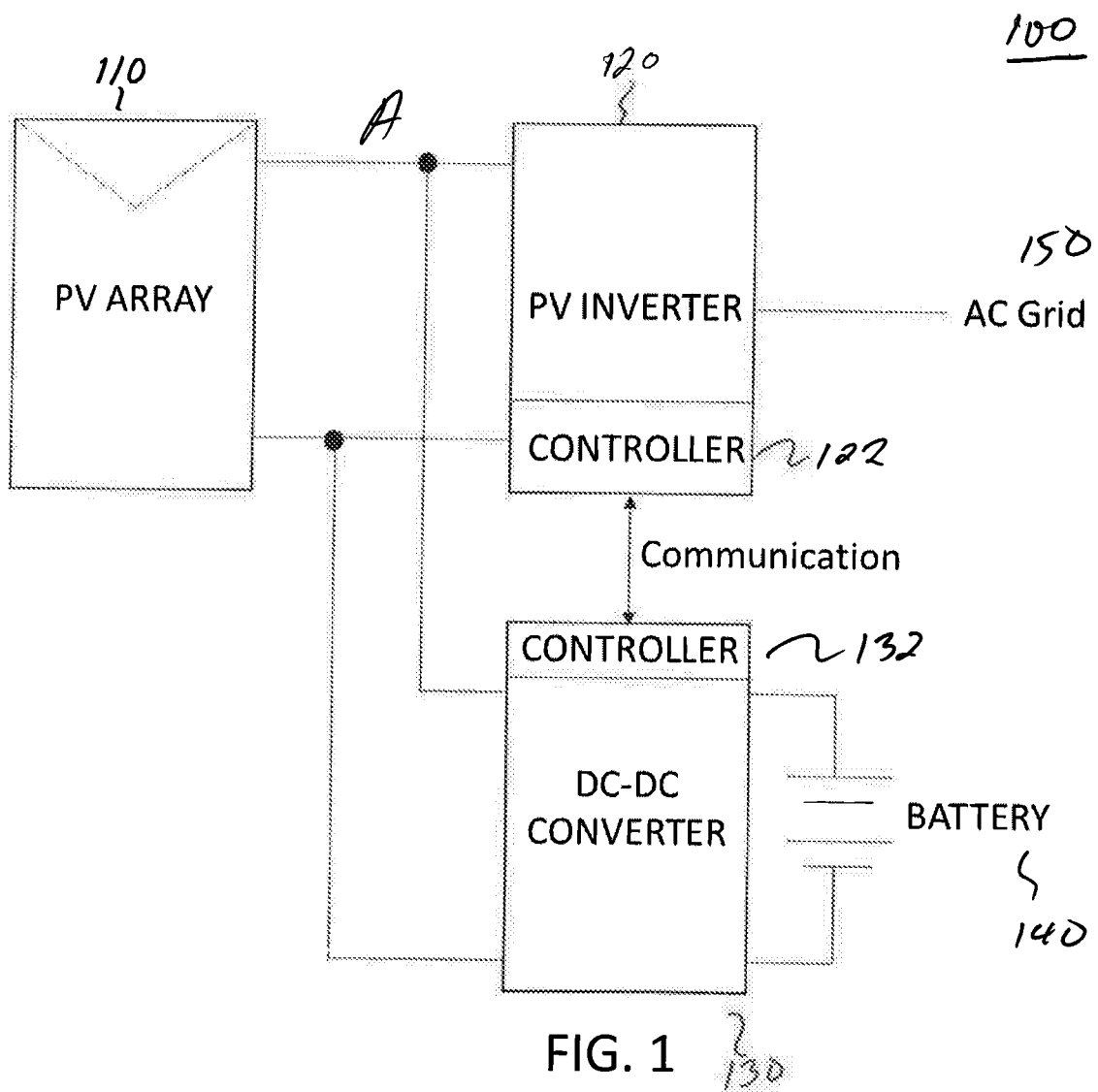
FIG. 1 shows a power system according to an embodiment in which a control system includes a PV inverter controller and an energy storage converter controller in communication with each other.
Figure 2:
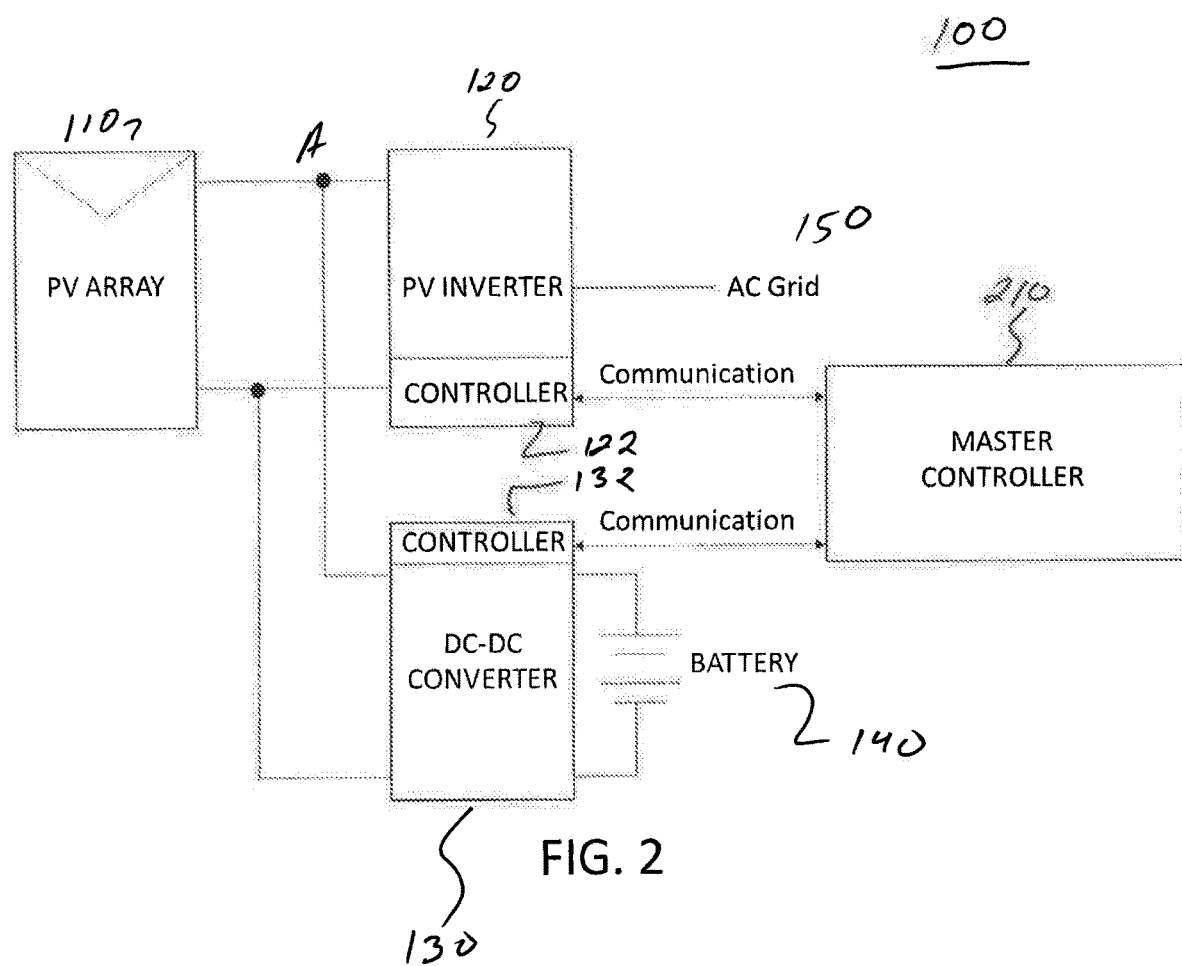
FIG. 2 shows a power system according to another embodiment in which a PV inverter controller and an energy storage converter controller communicate with a master controller.

Referring to FIGS. 1 and 2, a power system 100 according to an embodiment of the present invention includes a power source 110, a power inverter 120, an energy storage unit power converter 130, and an energy storage unit 140. The power source 110 is electrically coupled to the inverter 120 at DC bus A, and the converter 130 is electrically coupled between the DC bus A and the energy storage unit 140. The PV inverter converts power at the DC bus A, which may be provided by the power source 110 and/or the energy storage unit 140, to alternating current (AC) power output to a grid 150.

The grid 150 may, for example, be one or more loads, or it may a microgrid, a utility grid, etc. The power source 110 may, for example, be a photovoltaic source such as a PV array. The energy storage unit may, for example, be a battery or a plurality of connected battery cells. The power inverter 120 may for example, be a photovoltaic (PV) inverter that may, or may not, have bidirectional capabilities. Converter 130 may be a bidirectional DC/DC converter.

Due to design constraints and/or other factors, the power output by the power source 110 may exceed the maximum power that the inverter 120 can output to the grid 150. In this case, the inverter 120 needs to be curtailed, and the curtailed power can be referred to as "excess power." Curtailment may occur in circumstances such as, but not limited to, inverter clipping that occurs when the maximum power output of the power source 110 exceeds the inverter's 120 rating (i.e., maximum rated power output), the inverter's 120 temperature exceeding a predetermined value signaling the need to decrease power output to avoid inverter break down, or the inverter 120 receiving a power command (i.e., a command for a particular amount of power) from, e.g., a utility that is less that the amount of power being produced by the power source 110. In the embodiment illustrated in FIG. 1, the power system 100 can store this excess power in the energy storage unit 140, which can then later be discharged to the grid 150.

In the embodiment shown in FIGS. 1 and 2, the power converter controller 132 may obtain information about the operating point (P_Inv) (i.e., the level of the output power during operation) of the PV inverter. The information may be determined by voltage and current sensors at the output of the PV inverter or communicated digitally over a communication link via a variety of communication protocols, and it should be understood that this invention is no limited to any particular communication protocol.

When the power inverter's 120 output power (P_Inv) is close to the power inverter's 120 maximum power (P_InvMax), it is possible that the power inverter 120 is being curtailed (e.g., inverter clipping). Thus, when the power inverter's 120 output power (P_Inv) exceeds a predetermined threshold (P_InvMax-Pdelta) of the maximum power (P_InvMax) of the power inverter 120, the power converter controller 132 starts a control loop whose output is the energy storage unit 140 power (or current) command (Pcharge_cmd) (i.e., a command for the power converter 130 to charge the energy storage unit 140 with a particular amount of power). The control loop is started to store the excess energy available because of inverter 120 curtailment (e.g., clipping). This control loop controls the inverter's 120 output power (P_Inv) to be close to (i.e., within a predetermined range of) the maximum power value (P_InvMax). If the inverter's output power goes below the predetermined range of the maximum power (P_InvMax), it is determined that the converter controller 132 is controlling the converter 130 to extract too much energy from the power source 110. In this case, the battery charge power (P_Conv) is reduced (e.g., battery charge power may be automatically reduced by controlling the converter power command (P_Conv) iteratively or through a closed-loop controller such (as a PI controller) to return the inverter to the predetermined range of rated power (P_InvMax). Further, if the control loop requires the energy storage unit 140 to start discharging to maintain the inverter's output power within the predetermined range of the maximum power (P_InvMax), this in turn means that the available power source 110 power is below the predetermined range of the inverter's 120 maximum power (P_InvMax) and inverter 120 curtailment (e.g. clipping) will no longer occur.

As an alternative to using the predetermined range to determine whether the inverter 120 is curtailing, the converter controller 132 may instead implement a DC port A high voltage limit Vdc_HiLimit that is adjustable. The DC port high voltage limit Vdc_HiLimit is an adjustable value that may initially be set to be equal to or near the upper voltage limit of the operation range of the inverter 130. The converter controller 132 is also programmed to adjust the power charge output of the converter 130 to lower the voltage measured at the DC bus A when the voltage exceeds the DC port high voltage limit Vdc_HiLimit. The converter controller 132 then adjusts this DC port high voltage limit Vdc_HiLimit to track the maximum power point on the power source 110 when the inverter 120 is curtailing.

In the embodiment illustrated in FIG. 1, communication between the power inverter 120 and the power converter 130 is accomplished through a direct connection between the controller 122 of the power inverter 120 and the controller 132 of the power converter 130. Differently, in the embodiment shown in FIG. 2, communication is accomplished with the aid of a master controller 210. Each of the inverter controller 122 and the converter controller 132 communicates with the master controller 210, and the converter controller 132 obtains information about the operating point (P_Inv) of the inverter 120 from the master controller 210. The controllers 122, 132 and 210 may, for example, be embodied as field-programmable gate arrays (FPGA) and/or a digital processing based controller capable of being updated locally and/or remotely. However, it should be understood that the controllers 122, 132 and 210 are not limited only to these particular types, and can be any type of digital processor or analog or mixed signal circuit.

Although FIGS. 1 and 2 show systems capable of capturing excess power generated by a power source 110 using a control system that uses a communication link(s) between the inverter controller 122 and the converter controller 132 to obtain information about the operating point (P_Inv) of the inverter 120, the present invention is not limited as such, and the converter 130 may be capable of autonomously detecting when the inverter 120 is curtailed. In embodiments in which the autonomous detection is used, the direct communication between controllers 122 and 132 of FIG. 1 and the communication of the operating point (P_Inv) through master controller 210 is not required. This can be advantageous if, for example, if the communication link of FIG. 1 or FIG. 2 is damaged or if one wishes to avoid the expense of installing the communication link between the controllers 122 and 132.

In an embodiment, the autonomous control relies on the power source's 110 voltage dynamics when the inverter 120 is curtailed (e.g., because of clipping) in order to maintain the inverter 120 power output (P_PV) near the inverter's maximum output power (P_InvMax) while storing excess energy in the energy storage unit 140. Generally, when the inverter 120 is curtailed, the power source 110 voltage present at the DC bus A will rise. Although the rise in the power source voltage itself does not always mean that the inverter power is curtailed, when the converter 130 output power P_Conv does not follow its power command P_Charge_cmnd and the power supply voltage at DC bus A goes up, the inverter power (P_Inv) is curtailed.

In an embodiment of the autonomous method, the converter controller 132 implements a PV port high voltage limit (VpvHighLmt) and sets it higher than the measured PV voltage. When the converter controller 132 detects that the converter's output power (P_Conv) is different from the converter's commanded power (Pcharge_cmd) (this will occur in order to maintain the set VpvHighLmt), the converter controller 132 recognizes that the inverter power P_Inv is curtailing, and the converter controller 132 begins implementing its own maximum power point tracking (MPPT) algorithm by varying VpvHighLmt and extracting the maximum possible excess PV power.

In addition to charging the energy storage unit 140, the inverter controller 132 may be configured to discharge power from the battery to the inverter 120 for output at the grid 150. The energy discharged by the converter 130 may be excess energy stored when the power source's 110 maximum output power exceeded the PV inverter's maximum, but it may also be power from the grid 150 that is stored in the energy storage unit from a bidirectional PV inverter 120.

When discharging power to the power inverter 120, the converter controller 132 may be configured to ensure that any power available from the power source 110 is given priority over power stored in the energy storage unit. In order to do so, the converter controller 132 may be configured to monitor the power output by the power supply 110 to detect any decrease, and if there is a decrease, to adjust its discharge command to reduce the power discharged by the battery.

Charge

Figure 3:
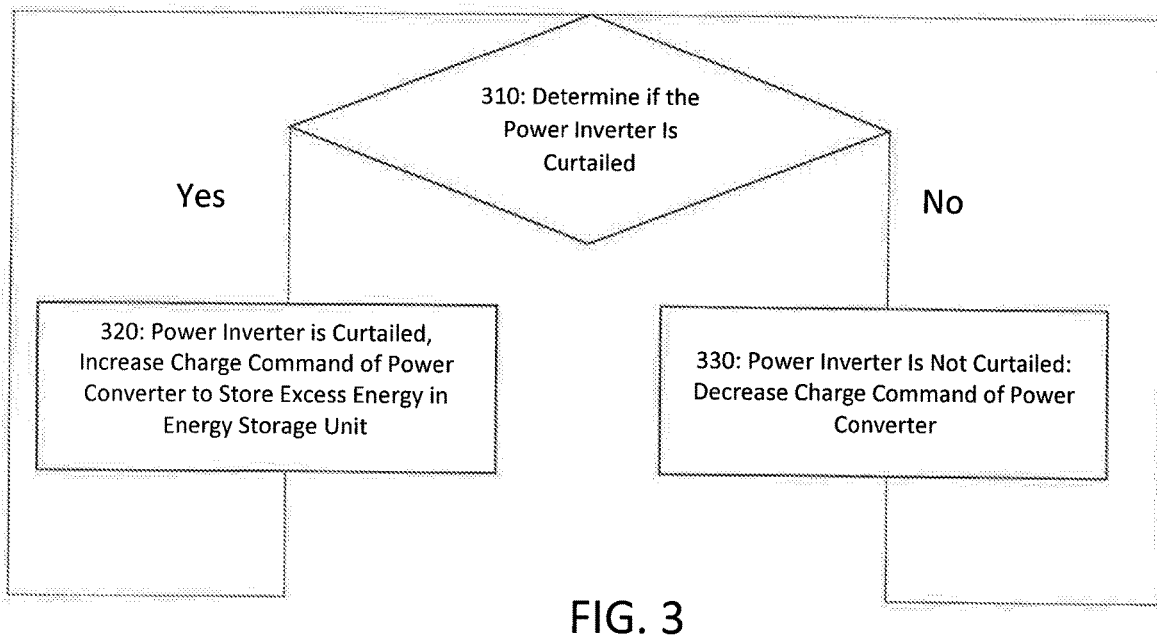
FIG. 3 is a flowchart illustrating a method of method of extracting excess power from a power supply according to an embodiment of the present invention.

FIG. 3 is a flow chart illustrating a method of extracting excess power from a power supply according to an embodiment of the present invention. Referring to FIG. 3, in step 310, the control system of the power system 100 determines if the power inverter 120 is curtailed. This may be accomplished through a communication link established between the inverter controller 122 and the converter controller 132 of the control system (e.g., as shown in FIGS. 1 and 2) or through autonomous detection by the converter controller 132. In step 320, when it is determined that the power inverter 120 is curtailed, the control system adjusts the charge command of the power converter 130 so that excess energy available because of the curtailment is stored in the energy storage unit 140. The charge command is a command for the converter 130 to charge a particular amount of power. In step 330, if the power inverter 120 is not curtailed, the control system may reduce the charge command to ensure that the power inverter is operating at maximum power. In Step 330, prior to decreasing the charge command, it may also be possible to determine whether too much power is being stored in the energy storage unit 140 by, for example comparing the output power of the inverter 120 to a predetermined range of the maximum inverter power (P_InvMax).

Figure 4:
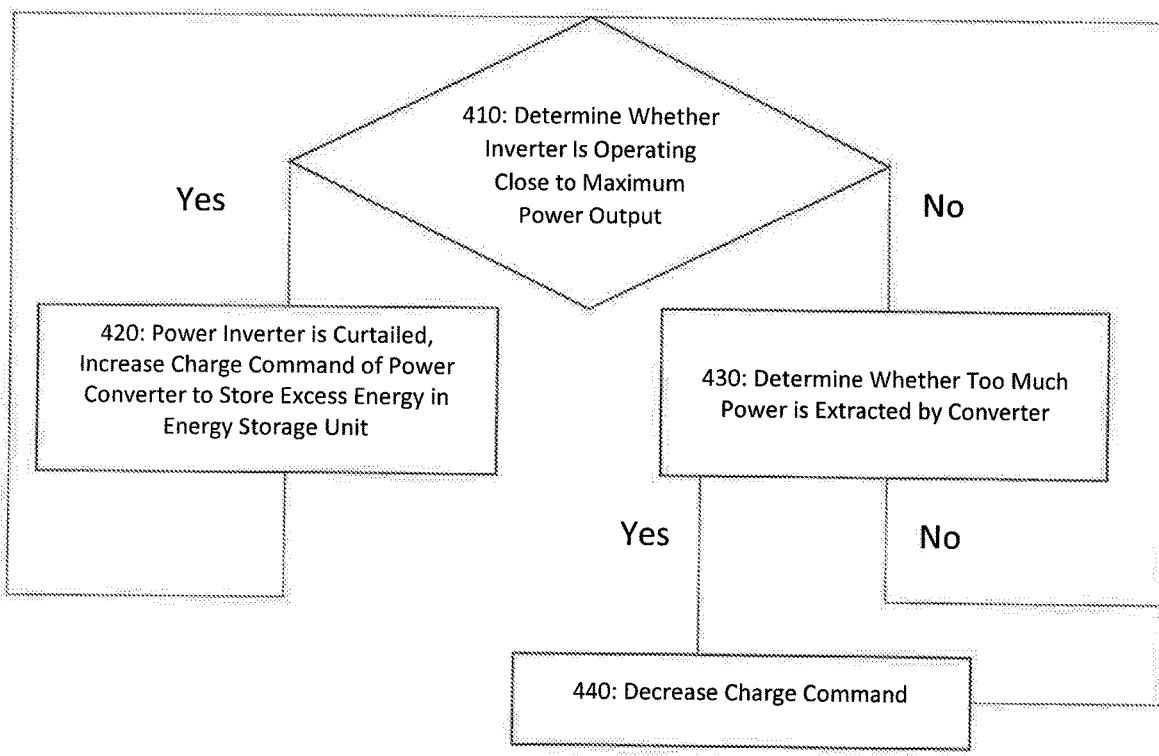
FIG. 4 is a flowchart illustrating a method of extracting excess power from a power supply according to an embodiment of the present invention.

FIG. 4 is a flow chart illustrating a method of extracting excess power from a power supply according to an embodiment of the present invention. FIG. 4 is a method of determining if the power inverter 120 is curtailed, increasing the charge command of the power converter 130 to store excess energy in the energy storage unit 140 when the power inverter is curtailed, and decreasing the charge command of the power converter 130 when the power inverter 120 is not curtailed in an embodiment in which the converter controller 132 has access to the inverter's 120 power output P_Inv through, for example, a communication link established between the inverter controller 122 and the converter controller 132.

Referring to FIG. 4, in step 410, the converter controller 130 compares the output power P_Inv to a first threshold value (P_InvMax−Pdelta) of the maximum output power (P_InvMax) of the inverter 120. This comparison is made to determine whether the inverter 120 is operating close to its maximum power output P_InvMax, in which case the inverter 120 may be curtailed. The threshold value may be set to be a difference of Pdelta from the maximum power output P_InvMax. The value of Pdelta may be relatively small and may, for example, be set based on the power rating of the inverter 120. For example, Pdelta may be set between a half percent and one percent of the inverter's 120 rating depending on the inverter's output power metering accuracy. However, it should be understood that the present invention is not limited to these particular Pdelta values.

In step 420, when it is determined that the inverter is operating close to the maximum power output P_InvMax, the converter controller 130 determines that the inverter 120 is curtailed, and the converter controller 130 increases the charge command (Pcharge_cmd) of the power converter 130. In this way, excess power from the power source 110 is extracted by the converter 130 and stored in the energy storage unit 140. When increasing the charge command (Pcharge_cmd), the charge command (Pcharge_cmd) may be increased by a predetermined amount (P_step) of power. After increasing the charge (Pcharge_cmd), the converter controller 130 returns to step 410.

When it is determined that the inverter is not operating close to the maximum power output P_InvMax, the converter controller 130 determines that the inverter 120 is not curtailed. Then, in step 430, the converter controller 130 determines whether too much power is being extracted by the converter. The converter controller 130 may make this determination by comparing the output power (P_Inv) of the inverter 120 to a second threshold value (P_InvMax−Pdelta−Pdelta2) of the maximum output power (P_InvMax) of the inverter 120. The second threshold value may be set to be a difference of Pdelta and Pdelta2 from the maximum power output P_InvMax. The value of Pdelta2 may, for example, be set to be the same value as Pdelta1. However, it should be understood that Pdelta2 is not limited to this particular value.

If the converter controller 130 determines that too much power is being extracted by the converter 130, in step 440, the converter controller 130 decreases the charge command Pcharge_cmd of the power converter by P_step. By reducing the charge command Pcharge_cmd, the converter controller 130 ensures that the power inverter 120 is operating at close to its maximum power output. After decreasing the charge command Pcharge_cmd, the converter controller 132 returns to step 410. If, in step 430, the converter controller 130 determines that the converter 130 is not extracting too much power, the converter controller 130 returns to step 410

The following control logic illustrates an embodiment in which the control system of the power system controls the converter 130 in a power command mode and the converter controller 132 has information about the inverter's maximum power command level P_InvMax and the operating power point of the inverter (P_Inv). The following control loop may be performed by the converter controller 132 in order to implement the method of FIG. 4.

```
While(1):
    P_PV=P_Conv+ P_Inv
    If ( ( P_Inv > P_InvMax - Pdelta)):
        Pcharge_cmd= Pcharge_cmd+P_step
    Else If (P_Inv < P_InvMax - Pdelta - Pdelta2)
        Pcharge_cmd= Pcharge_cmd-P_step
    endIf
    0< Pcharge_cmd< Conv_MaxChargeCommand
End while
```

In the above control loop, P_PV=P_ Conv+Pinv is a calculation of the power output of the power source 110. The power output of the power source 110 is calculated by summing the output powers P_CONV+P_Inv of the power converter 130 and the power inverter 120. If ((P_Inv>P_InvMax−Pdelta)) determines whether the output power (P_Inv) of the inverter exceeds a certain threshold (i.e., whether the inverter operating close to its maximum power), signaling that the inverter 120 is curtailed. Pcharge_cmd=Pcharge_cmd+P_step increases the charge command Pcharge_cmd of the converter 130 by P_step when the inverter 120 output power (P_Inv) exceeds the threshold to store excess power in the energy storage unit 140. Else If (P_Inv<P_InvMax−Pdelta−Pdelta2) determines whether the output power (P_Inv) is less than a second threshold signaling that too much power is being extracted by the converter 130. Pcharge_cmd=Pcharge_cmd−P_step decreases the charge command so that the power inverter 120 will operate close to its maximum power output. 0<Pcharge_cmd<Conv_MaxChargeCommand ensures that the charge command (Pcharge_cmd) of the converter 130 does not exceed its maximum charge command or power rating.

Figure 5:
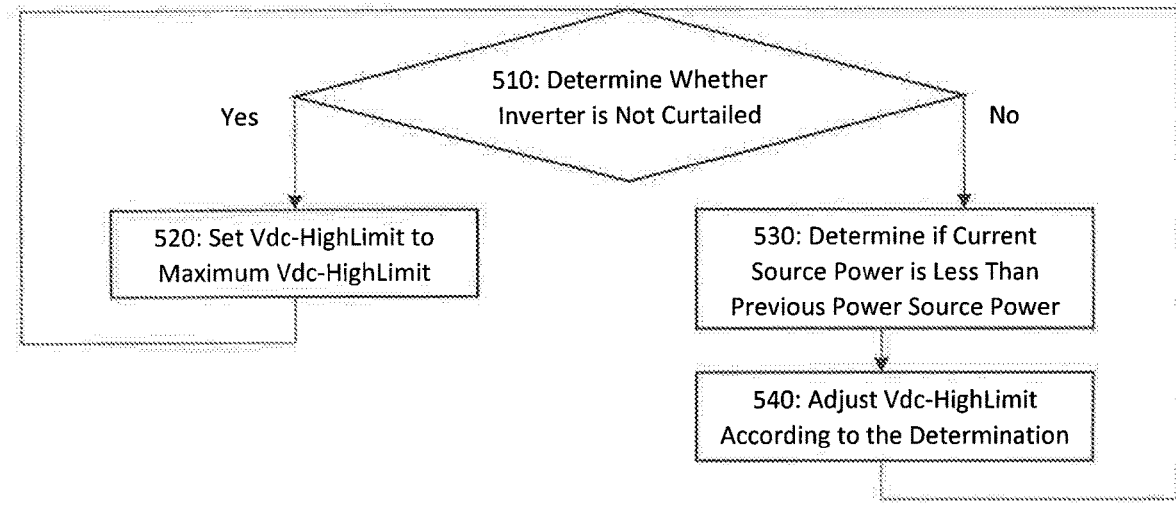
FIG. 5 is a flowchart illustrating a method of extracting excess power from a power supply according to an embodiment of the present invention.

FIG. 5 is a flowchart illustrating a method of extracting excess power from a power supply 110 according to an embodiment of the present invention. Similar to FIG. 4, FIG. 5 is a method of determining if the power inverter 120 is curtailed, increasing the charge command of the power converter 130 to store excess energy in the energy storage unit 140 when the power inverter 120 is curtailed, and decreasing the charge command of the power converter 130 when the power inverter is not curtailed in an embodiment in which the converter controller 132 has access to the inverter's 120 power output P_Inv through, for example, a communication link established between the inverter controller 122 and the converter controller 132. However, different from the embodiment shown in FIG. 4, the embodiment of FIG. 5 implements a DC port high voltage limit (Vdc_HiLimit) to extract excess power source 110 power.

In the method of extracting excess power illustrated in FIG. 5, the DC port high voltage limit Vdc_HiLimit on the PV port A is adjusted to track the maximum power point on the power source 110 when there is a possibility of excess power source 110 power. The DC port high voltage limit Vdc_HiLimit is an adjustable value programmed into the converter controller 132. The converter controller 132 also has a maximum DC port high voltage limit Vdc_HiLimit, which is referred to as Vdc_HiLimit_max, and a voltage change value for adjusting the value of Vdc_HiLimit, which is referring to as deltaV. The maximum DC port high voltage limit Vdc_HiLimit_max is a static value that does not change, and it is the maximum possible value for DC port high voltage limit Vdc_HiLimit. The maximum DC port high voltage limit Vdc_HiLimit_max may, for example, be the same as or close to the upper voltage limit of the inverter 120. The voltage change value deltaV is a predetermined value may be set to a relatively small value or may be selected as a design choice.

When performing the method illustrated in FIG. 5, the converter controller 132 is also programmed to prevent a voltage measured at the DC bus A from exceeding the DC bus high voltage limit Vdc_HiLimit. If the voltage at DC bus exceeds Vdc_HiLimit, the power command Pcharge_cmd of the converter controller 132 is increased to control the DC/DC converter 130 to extract power from the power source 110, which in turn should decrease the DC bus voltage below the DC port high voltage limit Vdc_HiLimit. Conversely, when the voltage at DC bus A is less that Vdc_HiLimit, the converter controller 132 may reduce the Pcharge_cmd to control the power converter 130 to reduce the power being extracted from the power source 110. The power command (Pcharge_cmd) of the converter 130 may be adjusted in a similar manner to that illustrated in FIG. 4, and thus, explanation thereof is omitted for brevity.

Generally, with a power source 110 such as a PV array, if the voltage is relatively high on the DC bus A, the inverter 120 is not drawing a lot of power. Further, when the inverter 120 goes into curtailment, the DC bus A voltage rises, because the full available power is not being drawn from the power source 110. Thus, if the converter controller 132 controls the converter 130 to extract excess power from the power source 110, then the voltage at the DC bus A will decrease. In the embodiment illustrated in FIG. 5, the Vdc_HiLimit is adjusted to track the maximum power point on the power source 110 (e.g. a PV array) when there is a possibility of excess PV power because of inverter 120 curtailment. Thus, for example, if the inverter 120 is operating at a DC bus A voltage of 1200V, and the inverter 120 is not curtailed, if the inverter then becomes curtailed, the voltage on the DC bus A will rise to 1250V. The converter controller 240 determines curtailment has started, and begins using its DC port high voltage limit Vdc_HiLimit and will extract power (P_Conv) for storage in the energy storage unit 140. Then, the DC bus A voltage will decrease.

The method will now be described with reference to FIG. 5. In step 510 the converter controller 132 determines whether the inverter 120 is not curtailed. In doing so, the converter controller may both check to see whether the inverter 120 is not curtailed because it's output power is less than the maximum output power of the inverter (P_InvMax) where maximum output power is set to the rated power of the inverter 120, and also that the inverter 120 is not curtailed due to high temperature or a maximum power command from a plant operator or utility. If the inverter 120 is not curtailed and the power output (P_Inv) of the inverter 120 is less than the inverter maximum power (P_InvMax), in step 520, the converter controller 132 sets the DC port high voltage limit (Vdc_HiLimit) to the maximum DC port high voltage limit Vdc_HiLimit_max. In this case, the power converter will not extract power from power source 110.

If the inverter 120 is curtailed or the inverter output power P_Inv exceeds the maximum output power P_InvMax, the converter controller 132 begins to adjust its Vdc_HiLimit to track the maximum power point of the power source 110. In step 530, the converter controller 132 first determines whether a calculated power source power (P_PV), which is calculated by summing the power output (P_Inv) of the inverter and the power output (P_Conv) of the converter, exceeds a previously calculated output power (P_old) that was calculated in a previous loop. In other words, the converter controller 132 determines whether power source power (P_PV) decreases or increases.

Then, in step 540, the converter controller 132 adjusts the DC port high voltage limit Vdc_HiLimit according to whether the power source power P_PV has increased or decreased. The DC port high voltage limit Vdc_HiLimit may be adjusted using the following equation:

$$Vdc\_HiLimit = Vdc\_measured + deltaV$$

Where:
Vdc_measured is the voltage measured at the DC bus A;
deltaV=−deltaV when P_PV has decreased; and
deltaV=deltaV when P_PV has increased.

In this equation, deltaV is a predetermined voltage change value whose sign is reversed if P_PV decreases. After adjusting the Vdc_HiLimit, the method continues back to step 510 to repeat the loop. Thus, when adjusting the Vdc_HiLimit during inverter 120 curtailment, as long as P_PV continues to increase, the Vdc_HiLimit is adjusted by adding deltaV to the measured DC bus A voltage. If P_PV decreases, the sign of deltaV is reversed, and the Vdc_HiLimit is adjusted by the reversed deltaV.

In the method of extracting excess power using the DC port high voltage limit (Vdc_HiLimit) of FIG. 5, as the DC port high voltage limit (Vdc_HiLimit) is reduced, the converter controller 132 will increase its power command (Pcharge_cmd). As the power command (Pcharge_cmd) is increased, the power (P_PV) output by the converter 130 to the energy storage unit 140 will increase. However, if too much power is extracted by converter 130, the output power (P_Inv) of the inverter 120 will decrease, which will reduce P_PV. In this case, the sign of deltaV is reversed such that Vdc_HiLimit will be increased and the converter power command (Pcharge_cmd) is reduced.

The following control logic illustrates an embodiment in which the control system of the power system controls the converter 130 in a power command mode, the converter controller 132 has information about the inverter's maximum power command level P_InvMax and the operating power point of the inverter (P_Inv), and the controller 132 implements an adjustable DC port high voltage limit (Vdc_HiLimit). The following control loop may be performed by the converter controller 132 in order to implement the method of FIG. 5.

```
While(1):
    P_PV=P_ Conv + P_Inv
    If ( ( P_Inv < P_InvMax) & INV is not curtailed ):
        Vdc_HiLimit = Vdc_HiLimit_max
    else:
        If (P_PV <P_PV_old):
            deltaV= - deltaV
        end if
        Vdc_HiLimit = Vdc_measured + deltaV
    End if-else
    0<Pcharge_cmd< Conv _MaxChargeCommand
End while
```

In the above control loop, P_PV=P_ Conv+P_Inv is a calculation of the power output of the power source 110. The power output of the power source 110 is calculated by summing the output powers P_Conv+P_Inv of the power converter 130 and the power inverter 120. If ((P_Inv<P_InvMax) & INV is not curtailed) is a determination as to whether the output power (P_Inv) of the inverter 120 is less than the inverter's 120 maximum output power (P_InvMax), wherein P_InvMax is, e.g., set to the inverter's 120 rated power, and checks that the inverter 120 is not curtailed for any other reason such as temperature or by command of a utility. Vdc_HiLimit=Vdc_HiLimit_max sets the DC port high voltage limit (Vdc_HiLimit) to the maximum DC port high voltage limit (Vdc_HiLimit_max) when the inverter output power P_Inv is less than the maximum inverter output power (P_InvMax) and the inverter 120 is not curtailed. If (P_PV<P_PV_old) determines whether the power source 110 (e.g., a PV array) power (P_PV) is less than the previous power source power (P_PV_old), which is from the previous loop. deltaV=−deltaV reverses the sign of deltaV when P_PV<P_PV_old. Vdc_HiLimit=Vdc_measured+deltaV is an equation for adjusting the DC port high voltage limit according to whether the power source power (P_PV) increases or decreases. 0<Pcharge_cmd<Conv_MaxChargeCommand ensures that the charge command (Pcharge_cmd) of the converter 130 does not exceed its maximum charge command.

Figure 6:
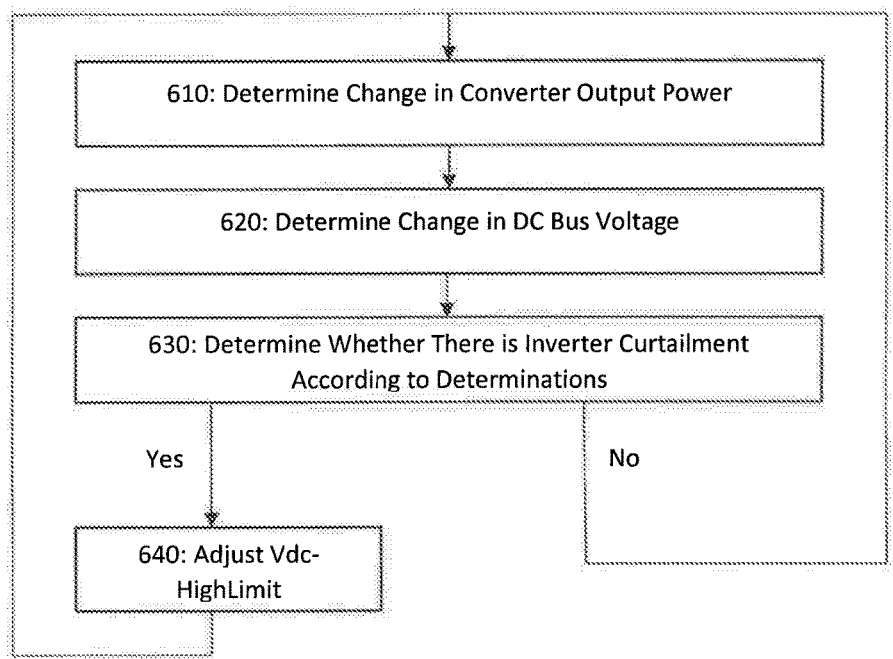
FIG. 6 is a flowchart illustrating a method of extracting excess power from a power supply according to an embodiment of the present invention.

FIG. 6 is a flowchart illustrating a method of extracting excess power from a power supply 110 according to an embodiment of the present invention. Similar to FIGS. 4 and 5, FIG. 6 is a method of determining if the power inverter is curtailed, increasing the charge command of the power converter to store excess energy in the energy storage unit when the power inverter is curtailed, and decreasing the charge command of the power converter when the power inverter is not curtailed. However, different from the embodiments shown in FIGS. 4 and 5, the embodiment of FIG. 6 autonomously captures excess power source 110 power (P_PV) without the need for a communication link between the inverter controller 122 and the converter controller 132.

Similar to the embodiment shown in FIG. 5, the method of autonomously extracting excess power utilizes the adjustable DC port high voltage limit (Vdc_HiLimit) programmed into the converter controller 132, and the converter controller 132 is also programmed to prevent a voltage measured at the DC bus A from exceeding the DC port high voltage limit Vdc_HiLimit. However, in the method shown in FIG. 6, the converter controller 132 automatically detects curtailment on the inverter 120 and starts to capture power source 110 (e.g., a PV array) power up to the maximum power source 110 power point. Because the converter controller 132 autonomously detects curtailment, the communication link between the converter controller 132 and the inverter controller 122 is not required, and the converter controller 132 does not need the inverter's output power (P_Inv) or maximum output power (P_InvMax). Thus, in this embodiment, the converter controller 132 autonomously detects curtailment on the power converter and controls the energy storage power converter to store the excess power in the energy storage unit up to the maximum power source 110 power point without requiring input from the inverter controller 122.

The method will now be described with references to FIG. 6. In order to determine whether there is inverter 120 curtailment, in steps 610 and 620, the converter controller 132 detects a change (delta P_Conv) in the output power (P_Conv) of the power converter 130 (step 610) and a change (delta V_PV) in the DC bus A voltage (V_PV) (step 620). In this embodiment, the output power (P_conv) is an absolute positive value indicating charge. Thus, a change (delta P_Conv) in the output power (P_Conv) of the power converter 130 that is positive indicates that the system is charging at a higher power rate.

Then, in step 630, the converter controller 132 determines whether there is inverter 120 curtailment according to the change (delta P_Conv) in the output power (P_Conv) of the power converter 130 and the change (delta V_PV) in the DC bus A voltage (V_PV). If the converter determines that there is curtailment, the high limit may be set close to where the DC bus A voltage was when the inverter 120 starts curtailing or just prior to the start of curtailment. When the inverter 120 starts curtailing, the DC bus A voltage will have the tendency to go up. Thus, the DC bus A voltage will exceed the high limit Vdc_HiLimit and the converter controller 132 will control the converter 130 to charge the energy storage unit 140. In the converter controller 132 determines that there is no curtailment, the method returns to step 610.

Once the converter controller 132 determines that inverter 120 is curtailing, in step 640, the converter controller 132 begins to track the maximum power in the power source 110.

Thus, in this method, while the inverter is in curtailment and is thus outputting a constant power, the controller 132 controls the DC/DC converter 130 to track the maximum power point on the power source. Thus, in normal operation mode, the inverter is not curtailing and is performing its own maximum power point tracking (MPPT) and is controlling the voltage on the DC bus. But when the inverter 120 goes into curtailment, the inverter is no longer controlling the voltage on the DC bus but instead is in constant power mode, so the DC/DC converter begins to adjust its DC high limit Vdc_HiLimit to do MPPT on the power source 110 (or in other words, extract the maximum power from the power source 110).

The following control logic illustrates an embodiment in which the control system of the power system controls the converter 130 in an autonomous mode in which the converter controller 132 automatically detects curtailment on the inverter 120 and starts to capture excess power source power without needing input from the inverter controller 122. The following control loop may be performed by the converter controller 132 in order to implement the method of FIG. 6.

```
While(1):
    delta P_Conv=P_Conv- P_Conv_old
    delta V_PV = V_pv - V_pv_old
    If ((delta P_Conv is positive) && (delta V_PV is 0 or small negative))
    OR ((delta P_ Conv is negative) && (delta V_PV is positive)):
        deltaV=-deltaV
    end if
    Vdc_HiLimit =   V_pv + deltaV
    P_ Conv _old= P_ Conv
    V_pv_old= V_pv
    Wait( wait timer)
End while
```

In the above control loop, delta P_Conv=P_Conv–P_Conv_old is a calculation for determining a change in the output power of the converter 130. delta V_PV=V_pv–V_pv_old is a calculation for determining a change in the voltage at the DC bus A. If ((delta P_Conv is positive) && (delta V_PV is 0 or small negative)) OR ((delta P_Conv is negative) && (delta V_PV is positive)) determines whether there is curtailment in the inverter 120 and whether the high limit voltage Vdc_HiLimit should be adjusted by reversing the sign of a voltage adjustment value deltaV. If the change in the charge output power of the converter 130 (delta P_Conv) is negative and the change in the voltage at the DC bus A is positive, this will indicate potential curtailment and the need to adjust the high limit Vdc_HiLimit to prevent curtailment. This IF statement also ensures that the converter 130 does not interfere with the inverter 120 in case both the converter controller 132 and inverter controller 122 both want to perform maximum power point tracking (MPPT). For example, when the available PV power is such that both the inverter 130 and the converter 130 work at their power ratings, both will want to perform MPPT. Consider a 1 MW inverter 120 and 250 kW converter 130. If 1.25 MW is available from the power source 110, both the inverter 120 and converter 130 will attempt to perform MPPT. At this point, the change in the DC bus A voltage (V_pv) will be very small (i.e., a small negative) since the V_pv curve peaks at the point. To make sure that the converter 130 does not interfere with the inverter 120, it is moved slightly off MPPT to the right by the IF statement If ((delta P_Conv is positive) && (delta V_PV is 0 or small negative)). deltaV= –deltaV is the reversal of the voltage change value deltaV.

Discharge

In order to accomplish maximum power output by the inverter 120, it may be necessary to supplement the power produced by the power source 110 with power from the energy storage unit. When both the PV array 110 and the energy storage unit 140 are providing power, it is preferable that power from the power source 110 be given priority over any power stored in energy storage, as otherwise, the power produced by the power source 110 may be lost. The power discharged from the energy storage unit 140 may be excess power from the power source 110 that was previously stored in the energy storage unit 140 when inverter 120 was curtailed. For example, in the case of a PV array, excess power may have been produced at a point of time when the PV array 110 was operating at a maximum power output and the inverter 120 was curtailed because the maximum power output of the PV array 110 exceeds the rated power of the inverter 120. This excess power may, for example, be stored in the energy storage unit in accordance with any of the methods illustrated in FIGS. 2-6. At a later point in time, sun incident on the PV array may decrease because of cloud cover, decreased daylight, etc, at which point power from energy storage unit 130 may be used to supplement power of the PV array. It should be understood that although the power provided by the energy storage unit may be previously stored excess power, the present invention is not limited in this manner. For example, power stored in energy storage unit 140 may come from other sources, such as the grid 150.

Figure 7:
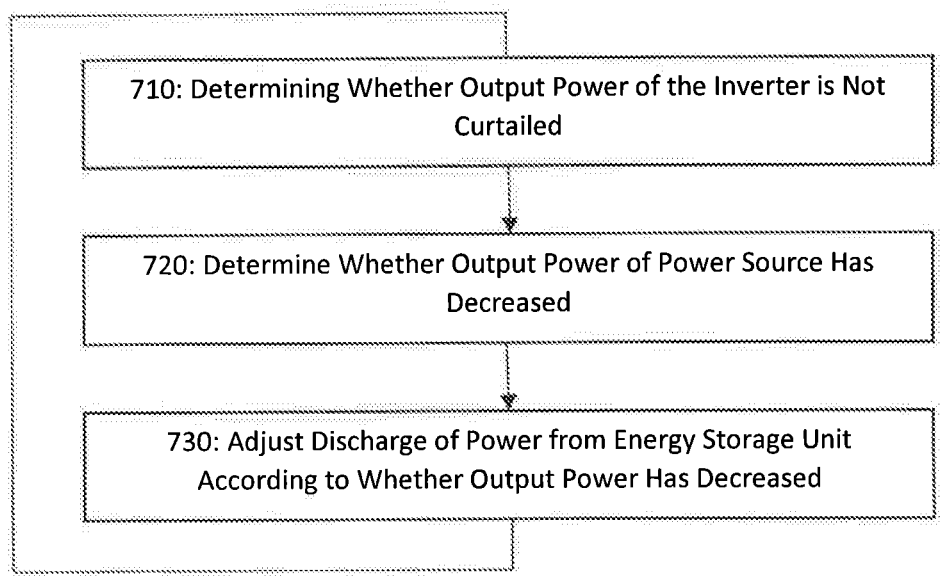
FIG. 7 is a flowchart illustrating a method of discharging power from an energy storage unit using a power converter while giving priority to power available from a power source according to an embodiment of the present invention.

FIG. 7 is a flowchart illustrating a method of discharging power from the energy storage unit 140 using power converter 130 while giving priority to power available from the power source 110 (e.g., a PV array) according to an embodiment of the present invention. Referring to FIG. 7, in step 710, the converter controller 132 determines whether the inverter 120 is not curtailed. In doing so, the converter controller 132 may determine whether the inverter 120 is not curtailed because the output power (P_Inv) of the inverter 120 is less than its maximum output power (P_InvMax) where maximum output power is set to the rated power of the inverter 120. Further, the converter controller may also ensure that the inverter 120 is not curtailed because of a high inverter 120 temperature or because of a maximum power command from a plant operator or utility. If the inverter 120 is curtailed, the converter controller may then control the power converter to either discharge no power or to charge using excess power if excess power from the power source 110 is available. When it is determined that the inverter is not curtailed, in step 720, the converter controller 132 determines whether the output power (P_PV) of the power source 110 has decreased. Then, in step 730, the converter controller 132 adjusts the amount of power being discharged from the energy storage unit 140 according to whether the output power (P_PV) of the power source 110 has decreased. For example, if the output power (P_PV) of the power source 110 decreased when the discharge of the energy storage unit 140 increased, the converter controller 132 will control the converter 130 to discharge less power. Conversely, if the output power (P_PV) of the power source 110 stayed the same when the discharge of the energy storage unit increased, the converter controller may control the converter 130 to discharge more power.

Figure 8:
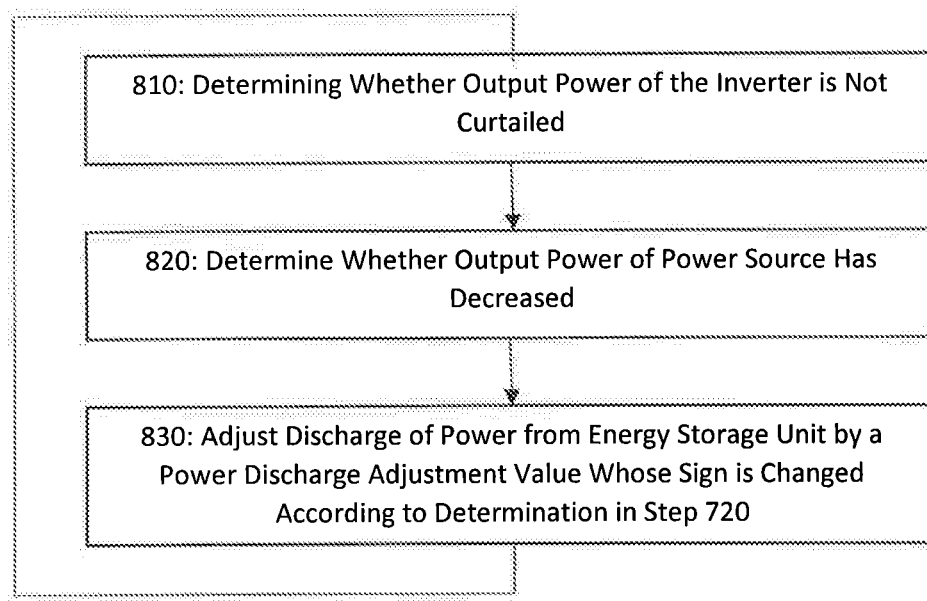
FIG. 8 is a flowchart illustrating a method of discharging power from an energy storage unit using a power converter while giving priority to power available from a power source according to an embodiment of the present invention

FIG. 8 is a flowchart illustrating a method of discharging power from the energy storage unit 140 using power converter 130 while giving priority to power available from the power source 110 (e.g., a PV array) according to an embodiment of the present invention. Similar to FIG. 7, FIG. 8 is a method of determining whether the inverter is not curtailed;

determining whether the output power (P_PV) of the power source 110 has decreased; and adjusting the amount of power being discharged from the energy storage unit 140 according to whether the output power (P_PV) of the power source 110 has decreased. In FIG. 8, discharge of the energy storage unit is controlled by adjusting a discharge power command (Pdischarge_cmd) for the converter 130 to discharge an amount of power by a power discharge adjustment value P_step whose sign is changed according to whether the output power (P_PV) of the power source 110 has decreased (in other words, power being discharged from the energy storage unit is adjusted using the power discharge adjustment value P_step).

Referring to FIG. 8, in step 810, the converter controller 132 determines whether the inverter 120 is not curtailed. In doing so, the converter controller 132 may determine whether the inverter 120 is not curtailed because the output power (P_Inv) of the inverter 120 is less than its maximum output power (P_InvMax) where maximum output power is set to the rated power of the inverter 120. Further, the converter controller may also ensure that the inverter 120 is not curtailed because of a high inverter 120 temperature or because of a maximum power command from a plant operator or utility. In an embodiment, the output power (P_Inv) of the inverter may be provided to the converter controller 132 through a direct communication link with the inverter controller 122 or through a communication link established with a master controller 210. If the inverter 120 is curtailed, or if the output power P_Inv of the inverter 120 exceeds its maximum output power, the converter controller may then control the power converter to discharge no power.

In step 820, when it is determined that the inverter is not curtailed, the converter controller 132 determines whether the output power (P_PV) of the power source 110 has decreased. In making this determination, the converter controller 132 may compare the current output power (P_PV) of power source 110 to a previous output power (P_PV_old) (e.g., P_PV_old may be the output power of a previous control loop). The current output power (P_PV) may, for example, be calculated by adding the output power (P_Conv) to the output power (P_Inv) or may be a measurement taken at the DC bus A.

In step 830, the converter controller 132 adjusts the discharge command (Pdischarge_cmd) for controlling the converter 130 to discharge a particular amount of power according to the determination made in step 820. The the discharge command (Pdischarge_cmd) may be adjusted in accordance with the following equation:

$$P\text{discharge\_cmd}=P\text{discharge\_cmd}+P\_step$$

Where:
Pdischarge_cmd is a command for the converter 130 to discharge an amount of power from the energy storage unit;
P_step=−P_step_old when P_PV has decreased; and
P_step=P_step_old when P_PV has increased or remains the same In this equation, P_step is a predetermined power discharge change value whose sign is reversed if the output power P_PV of the power source 110 decreases. As shown in FIG. 8, after step 830, the method continues back to step 810 to repeat the control loop. Thus, if, for example, the output power (P_PV) of the power source 110 decreased when the discharge of the energy storage unit increased by P_step, the converter controller 132 will control the converter 130 to reduce the discharge command by P_step. Conversely, if the output power (P_PV) of the power source 110 stayed the same or increased when the discharge of the energy storage unit increased by P_step, the converter controller may control the converter 130 to increase again by P_step.

The following control loop illustrates an embodiment in which the control system of the power system 100 controls the converter 130 in a power command mode, the converter controller 132 has information about the inverter's maximum power command level P_InvMax and the operating power point of the inverter (P_Inv), and the controller 132 implements a predetermined power discharge change value P_step. The following control loop may be performed by the converter controller 132 in order to implement the method of FIG. 8.

```
While(1):
    P_PV=P_ Conv + P_Inv
    If ( ( P_Inv < P_InvMax) & INV is not curtailed ):
        If (P_PV <P_PV_old):
            P_step= - P_step_old
        End if
        Pdischarge_cmd= Pdischarge_cmd+P_step
    else:
        Pdischarge_cmd= 0
    End if-else
    0<Pdischarge_cmd< Conv _MaxDischargeCommand
    P_PV_old= P_PV
    P_step_old= P_step
End while
```

In the above control loop, the power command (Pdischarge_cmd) is a positive command for commanding the converter 130 to discharge an amount of power from the energy storage unit 140 and P_Conv is an absolute positive value indicating discharge. P_PV=P_Conv+P_Inv is a calculation of the power output of the power source 110. The power output of the power source 110 is calculated by summing the output powers P_Conv+P_Inv of the power converter 130 and the power inverter 120. If ((P_Inv<P_InvMax) & INV is not curtailed) is a determination as to whether the output power (P_Inv) of the inverter 120 is less than the inverter's 120 maximum output power (P_InvMax), where P_InvMax is set to the inverter's 120 rated power, and whether the inverter 120 is curtailed for some other reason. If (P_PV<P_PV_old) determines whether the power source 110 (e.g., a PV array) power (P_PV) is less than the previous power source power (P_PV_old), which is from the previous loop. P_step= −P_step_old reverses the sign of P_step when the power source 110 power (P_PV) is less than the old power source 110 power (P_PV_old). Pdischarge_cmd=Pdischarge_cmd+ P_step is for adjusting the power command (Pdischarge_cmd) of the converter 130. Pdischarge_cmd=0 sets the power command (Pdischarge_cmd) to zero when the inverter 120 power (P_PV) is greater than its max (P_InvMax) or when the inverter 120 is curtailed. 0<Pdischarge_cmd<Conv_MaxDischargeCommand ensures that the discharge command (Pdischarge_cmd) of the converter 130 does not exceed its maximum discharge. P_PV_old=P_PV sets the current power source 110 power output (P_PV) as the old power source 110 power output (P_PV_old), and P_step_old=P_step sets the current power discharge change value as the old power discharge value.

In addition to discharging power to supplement the output power of the power source, in an embodiment, the converter controller 132 can be configured to emulate a power source 110 such as a PV array using power stored in the energy storage unit 140. In a system such as that shown in FIGS. 1 and 2, it is possible that power on the PV array will be absent due to, for example, heavy cloud cover or it being nighttime. The converter controller 132 is configured to control the converter 130 to emulate the PV array power source 110 at its output, so it appears to the inverter as the PV array power source 110 is operating. The power converter may emulate the MPPT algorithm of the power source 110 and settle on the power that needs to be discharged to simulate the maximum power point of the PV array. This emulation may, for example, be desirable in situations such as when the inverter 132 does not have a constant power operation mode and instead has only a MPPT operation mode.

Figure 9:
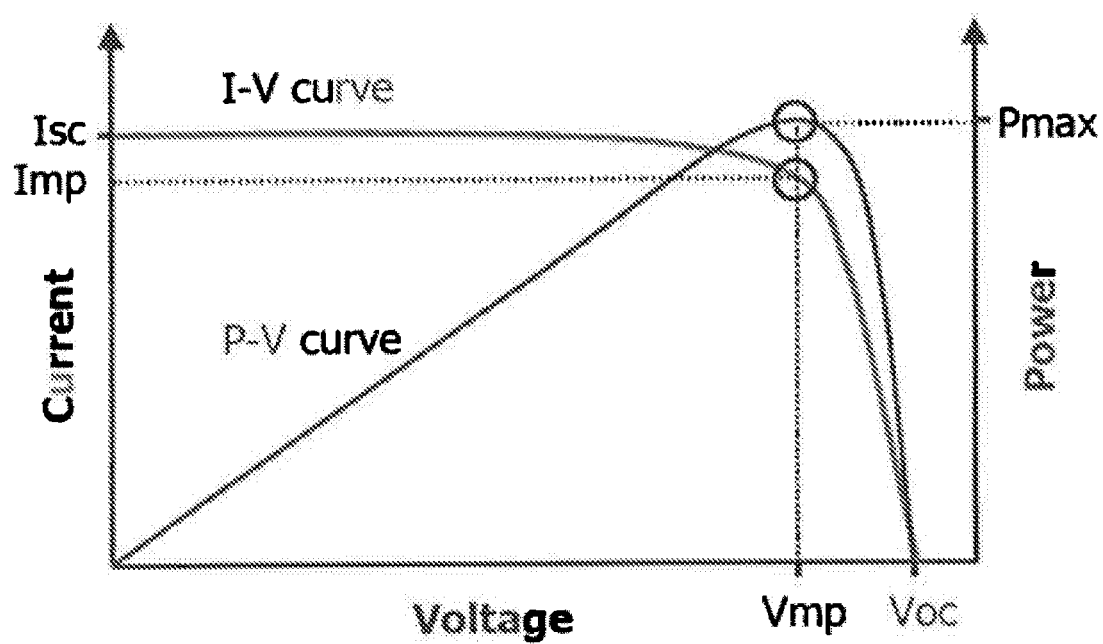
FIG. 9 is a graph illustrating PV array power-voltage characteristics.

In an embodiment, the converter controller 132 may accomplish PV array power source emulation by having stored thereon a look up table that is programmed to emulate the power-voltage characteristics of the PV array power source 110. Exemplary PV array power-voltage characteristics are shown in FIG. 9. The lookup table is programmed into the DC/DC converter includes an array of voltages and a corresponding array of power. The converter controller 132 receives the voltage on the DC bus A (this may, e.g., be a measured voltage), looks the voltage up on the look up table, and obtains the corresponding output power. The converter controller 132 then controls the converter 130 to output the power obtained from the look-up table into the DC bus A.

Through the use of the look up table, the converter controller 132 can control the converter 130 to discharge the energy storage unit 140 to output power to the inverter at a constant power point that is known based on the look up table. Accordingly, the output of the DC/DC converter is controlled to emulate the output of the PV array. In this embodiment, the inverter controller 122 may be controlling the inverter 120 using its MPPT, and as the inverter 120 changes the voltage on the DC bus A, the converter controller 132 controls the converter 130 to output a current corresponding to the voltage on the DC bus A to supply the power corresponding to the DC bus A voltage in the look up table. Accordingly, the power command (Pcmd) of the converter controller 132 is a function of the measured PV bus voltage, and may be given as $$Pcmd=f(v\_pv)$$

Where:
v_pv is the measured DC bus voltage A; and
Pcmd is a command for the converter 130 to discharge an amount of power as a function of v_pv based on the look-up table.

In additional to emulation through use of a look up table, in another embodiment of the present invention, the converter controller 132 may emulate the power output of the PV array based on a droop parameter. The droop method does not employ a look-up table, but uses a mathematical equation to approximate the voltage-power characteristics of a PV array. This is done so as to emulate approximately a PV array and 'fool' the inverter's control system into outputting a desired amount of set power while the inverter's control system is performing in MPPT mode. The following control logic illustrates an embodiment in which the converter controller 132 calculates its power command Pcmd based on a droop parameter.

```
While(1)
   If (V_pv>V_set):
      Pcmd=Pset-Vdroop*(V_pv-V_set)
   End if
End while
```

In the above control loop, V_pv is the DC bus A voltage. Pcmd is a command for the converter 130 to discharge a particular amount of power. V_set is a set voltage and may be determined based on the operating range of the PV inverter. Pset is the desired power output of the PV inverter. The set voltage (V_set) and the droop parameter Vdroop are selected in order to emulate the current voltage characters of the PV array power source 110. For example, if the inverter operating range is 800-1100 Vdc, Vset may be set to 900V.

Embodiments of the present invention include system and methods for charging and discharging power to/from an energy storage unit. In embodiments of the present invention, excess power generated by a power source that may be lost due to power converter curtailment is captured and stored in an energy storage unit, thereby preventing loss of this power and increasing efficiency of the power generation. Further, in embodiments of the present invention, power stored in the energy storage unit may be discharged while providing priority to any power that is being generated by the power source to prevent loss of any power being generated by the power source, thereby increasing efficiency of power generation. Further, in embodiments of the present invention, the power source can be emulated by a power converter controller to discharge power from an energy storage unit.

It will be apparent to those skilled in the art that various modifications and variations can be made to the disclosed power system without departing from the scope of the disclosure. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

The invention claimed is:

1. A power system for connecting a power source, an energy storage unit and a grid, the power system comprising
   a power inverter electrically coupled to the power source through a DC bus, wherein the power inverter converts DC power from the DC bus to AC power output to the grid;
   an energy storage power converter electrically coupled between the DC bus and the energy storage unit, wherein the energy storage power converter stores power in the energy storage unit and discharges power from the energy storage unit; and
   a controller for controlling the energy storage power converter, the controller being configured to:
      control the energy storage power converter to store excess power from the power source that cannot be output to the grid in the energy storage unit by iteratively adjusting a charge command of the energy storage power converter by a predetermined power adjustment value in a closed loop manner having the adjusted charge command as an input to the closed loop;
      control the energy storage power converter to discharge power stored in the energy storage unit to the power inverter to output to the grid;
      determine if a current output power of the power source is less than a previous output power of the power source in the closed loop; and
      if the current output power of the power source is less than the previous output power of the power source in the closed loop, reverse a sign of the predetermined power adjustment value from positive to negative or from negative to positive,
adjust a high voltage limit on the DC bus to a value which adds a measured voltage on the DC bus and the predetermined power adjustment value, and
adjust the charge command of the power converter to adjust an actual voltage of the DC bus to the adjusted high voltage limit.

2. The power system of claim 1, wherein the controller being configured to control the energy storage power converter to capture excess power from the power source comprises the controller being configured to:
determine if the power inverter is curtailed;
when the power inverter is not curtailed and the current output power of the power source is less than a maximum power command level of the power inverter, adjust the high voltage limit on the DC bus to a maximum high voltage limit on the DC bus.

3. The power system of claim 1 wherein the controller is a converter controller for controlling the energy storage power converter, and the controller being configured to control the energy storage power converter to capture excess power from the power source includes the controller being configured to:
autonomously detect curtailment on the power inverter without input from a power inverter controller according to a change in output power of the energy storage power converter and a change in voltage at the DC bus; and
when curtailment is detected, control the energy storage power converter to store the excess power in the energy storage unit up to a maximum power source power point.

4. The power system of claim 1, wherein the controller is a converter controller for controlling the energy storage power converter, and the controller being configured to control the energy storage power converter to capture excess power from the power source comprises the control system being configured to:
determine a change in an output power of the energy storage power converter;
determine a change in a voltage at the DC bus;
adjust a high voltage limit on the DC bus according to the change in the output power of the energy storage power converter and the change in the voltage at the DC bus.

5. The power system of claim 1, wherein the controller being configured to control the energy storage power converter to discharge power stored in the energy storage unit to the power inverter to output to the grid includes the controller being configured to discharge power from the energy storage unit while giving priority to any power available from the power source.

6. The power system of claim 5, wherein the controller being configured to discharge power from the energy storage unit while giving priority to any power available from the power source includes the controller being configured to:
determine whether the power inverter is not curtailed;
when the power inverter is not curtailed, determine whether an output power of the power source has decreased in a previous iteration, and control the energy storage power converter to adjust a discharge power command for commanding the energy storage power converter to discharge an amount of power from the energy storage unit according to whether the output power of the power source has decreased.

7. The power system of claim 6, wherein the controller being configured to adjust the power being discharged from the energy storage unit according to whether the output power of the power source has decreased includes the controller being configured to iteratively adjust the discharge power command by a predetermined power discharge adjustment value whose sign is reversed from positive to negative or from negative to positive according to whether the output power of the power source has decreased.

8. The power system of claim 1, wherein the power source is a photovoltaic power source, and the controller being configured to control the energy storage power converter to discharge power stored in the energy storage unit to the power inverter to output to the grid includes the controller being configured to control the energy storage power converter to emulate an MPPT algorithm of the power output of the photovoltaic power source.

9. The power system of claim 8, wherein the controller emulates the photovoltaic power source through a look up table programmed to emulate the power-voltage characteristics of the photovoltaic power source.

10. The power system of claim 8, wherein the controller emulates the photovoltaic power source by controlling a power command of the energy storage unit power converter based on a droop parameter.

11. The power system of claim 1, wherein the controller is a converter controller of the energy storage unit converter, and the converter controller communicates with a controller of the power inverter to obtain information about the output power of the power inverter.

12. A method of capturing excess power from a power source in a power system comprising a power inverter coupled to the power source through a DC bus, and an energy storage power converter coupled between the DC bus and an energy storage unit, the method comprising:
autonomously detecting curtailment on the power converter according to a change in output power of the energy storage power converter and a change in voltage at the DC bus;
when the power inverter is curtailed, adjusting a charge command of the power converter to store excess power from the power source that cannot be output to the grid in the energy storage unit;
determining a change in an output power of the energy storage power converter;
determining a change in a voltage at the DC bus; and
adjusting a high voltage limit on the DC bus according to the change in the output power of the energy storage power converter and the change in the voltage at the DC bus in a closed loop,
wherein the high voltage limit is iteratively adjusted by a predetermined voltage change value
a sign of the voltage change value is reversed from positive to negative or from negative to positive when the change in the output power of the energy storage power converter is positive and the change in the at the DC bus is zero or a small negative value, and
the sign of the voltage change value is reversed from positive to negative or from negative to positive when the change in the output power of the energy storage power converter is negative and the change in the at the DC bus is positive.

13. The method of claim 12, wherein autonomously detecting curtailment on the power converter includes determining that curtailment on the power converter occurs when the change in the output power of the energy storage unit is negative and the change in voltage at the DC bus is positive.

14. A method of discharging power stored in an energy storage unit to output to a grid in a power system comprising a power inverter coupled to a power source through a DC bus, and an energy storage power converter coupled between the DC bus and the energy storage unit, the method comprising:

discharging power from the energy storage unit to the power inverter to supplement power output by the energy supply such that the power inverter can supply the power to the grid, wherein, the power from the energy storage unit is discharged by iteratively adjusting a power discharge command of the energy storage unit by a predetermined power discharge change value according to a change in an output power of the power source in a closed loop having the adjusted power discharge command as an input to the closed loop, wherein when discharging power from the energy storage unit, power available from the power source is given priority over power available from the energy storage unit, wherein discharging power from the energy storage unit to the power inverter such that the power inverter can supply the power to the grid comprises:
  determining whether the power inverter is not curtailed,
  when the power inverter is not curtailed, determining whether an output power of the power source has decreased, and
  adjusting a power being discharged from the energy storage unit according to whether the output power of the power source has decreased, and wherein the power being discharged from the energy storage unit is iteratively adjusted by a predetermined power discharge adjustment value whose sign reversed from positive to negative or from negative to positive according to whether the output power of the power source has decreased.

15. A method of discharging power stored in an energy storage unit to output to a grid in a power system comprising a power inverter coupled to a power source through a DC bus, and an energy storage power converter coupled between the DC bus and the energy storage unit, the method comprising:

obtaining a voltage of the DC bus; and discharging power from the energy storage unit to the power inverter such that the power inverter can supply the power to the grid by emulating an MPPT algorithm of the power source according to the voltage of the DC bus, wherein discharging power from the energy storage unit to the power inverter such that the power inverter can supply the power to the grid comprises:
  emulating the photovoltaic power source by controlling a power command of the energy storage unit power converter based on a droop parameter, wherein emulating the photovoltaic power source comprises:
  calculating a power command for controlling the energy storage converter to output power in accordance with the following equation:

$$Pcmd = Pset - Vdroop * (V\_pv - V\_set)$$

wherein where:
  Pcmd is the power command;
  Pset is a predetermined set power;
  Vdroop is the droop parameter for emulating the current voltage characters of the photovoltaic power source;
  V_pv is the voltage of the DC bus; and
  V set is a predetermined set voltage for emulating the current voltage characters of the photovoltaic power source.

16. The method of claim 15, wherein the power from the energy storage unit is discharged by emulating the MPPT algorithm of the power source when power from the energy source is absent.

* * * * *